(12) United States Patent
Srinivasan

(10) Patent No.: US 12,309,000 B2
(45) Date of Patent: May 20, 2025

(54) VISUALIZER FOR CLOUD-BASED 5G DATA AND TELEPHONE NETWORKS

(71) Applicant: DISH Wireless L.L.C., Englewood, CO (US)

(72) Inventor: Prakash Srinivasan, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 91 days.

(21) Appl. No.: 18/300,836

(22) Filed: Apr. 14, 2023

(65) Prior Publication Data

US 2023/0336379 A1 Oct. 19, 2023

Related U.S. Application Data

(60) Provisional application No. 63/331,117, filed on Apr. 14, 2022.

(51) Int. Cl.
*H04L 12/46* (2006.01)
*H04L 41/0246* (2022.01)

(52) U.S. Cl.
CPC ...... *H04L 12/4641* (2013.01); *H04L 41/0246* (2013.01)

(58) Field of Classification Search
None
See application file for complete search history.

(56) References Cited

U.S. PATENT DOCUMENTS

| 2014/0320500 | A1* | 10/2014 | Fletcher | G06F 11/3409 |
| | | | | 345/440 |
| 2015/0163206 | A1* | 6/2015 | McCarthy | G06F 21/6227 |
| | | | | 726/4 |
| 2015/0310188 | A1* | 10/2015 | Ford | H04L 63/101 |
| | | | | 726/28 |
| 2017/0289169 | A1* | 10/2017 | Plichta | H04L 63/102 |
| 2018/0314751 | A1* | 11/2018 | Filippi | G06F 16/283 |
| 2020/0137097 | A1* | 4/2020 | Zimmermann | H04L 63/1425 |
| 2020/0374309 | A1* | 11/2020 | Carroll | H04L 12/4625 |
| 2022/0086178 | A1* | 3/2022 | Jayamohan | G06F 9/45558 |
| 2022/0103518 | A1* | 3/2022 | LaChance | H04L 63/0435 |
| 2022/0210027 | A1* | 6/2022 | Dong | H04L 41/16 |
| 2022/0321469 | A1* | 10/2022 | Qian | H04L 12/4633 |
| 2022/0342690 | A1* | 10/2022 | Shua | G06F 11/301 |
| 2023/0065530 | A1* | 3/2023 | Mohanty | G06F 11/3068 |

(Continued)

*Primary Examiner* — Phyllis A Book
(74) *Attorney, Agent, or Firm* — KW Law, LLP

(57) ABSTRACT

A process for monitoring a 5G data and telephone network can include starting a first instance and a second instance of a network function in a virtual private cloud (VPC). The first instance uses a first user account, and the second instance uses a second user account. A first log includes entries associated with the first instance in response to activities of the first user account. A second log includes entries associated with the second instance in response to activities of the second user account. The first log and second log go to a log destination of a centralized cloud account. A data stream comprising transformed data from the log destination goes into a bucket associated with the centralized cloud account. A query selects a data set from the bucket that includes attributes associated with network activities of the first and second user accounts.

20 Claims, 6 Drawing Sheets

(56) References Cited

U.S. PATENT DOCUMENTS

| | | | | |
|---|---|---|---|---|
| 2023/0164082 A1* | 5/2023 | Adogla | ................... | H04L 47/20 |
| | | | | 370/235 |
| 2023/0164113 A1* | 5/2023 | Gupta | ................. | H04L 63/0272 |
| | | | | 709/245 |
| 2023/0169126 A1* | 6/2023 | Poston | ................ | H04L 67/1004 |
| | | | | 707/737 |

* cited by examiner

| Resources Collection 400 | |
|---|---|
| Search... 404 | |
| Title | LastModified 406 |
| Accounts | 2022-04-13 15:07:47+00:00 |
| Buckets | 2022-04-12 18:05:56+00:00 |
| EIPs | 2022-04-13 15:12:46+00:00 |
| EKS | 2022-04-13 16:12:27+00:00 |
| ENIs | 2022-04-13 16:12:26+00:00 |
| Images | 2022-04-12 05:05:57+00:00 |
| Instances | 2022-04-13 16:12:24+00:00 |
| LoadBalancers | 2022-04-13 15:12:46+00:00 |
| Log | 2022-04-13 15:12:46+00:00 |
| SSM | 2022-04-13 12:13:08+00:00 |
| SecurityGroups | 2022-04-13 15:12:46+00:00 |
| Subnets | 2022-04-13 16:12:25+00:00 |
| Volumes | 2022-04-13 16:12:27+00:00 |

FIG. 4

| Cloud Gazer | VPC Flow Logs | VPC Flow Logs Chart | Decode STS | Resources | 500 | Accounts |

502 —

| | accountid | sourceaddress | destinationaddress | | protocol | | timefilter | |
|---|---|---|---|---|---|---|---|---|
| | * | ALL | ALL | | ALL | | Last Hour (Default) ∨ | |
| | interfaceid | sourceport | destinationport | | action | | region | |
| | * | ALL | ALL | | REJECT | | us-east-2 ∨ | |

[Apply Filter] [Clear Filters]

504 —

| logtime | version | account | interfaceid | sourceaddress | destinationaddress | sourceport | destinationport | protocol |
|---|---|---|---|---|---|---|---|---|
| 2022-04-13T16:10:26Z | 2 | 80716028345 | eni-0b7b12fa650c4984f | 192.168.29.194 | 192.168.65.199 | 0 | 0 | 1 |
| 2022-04-13T16:10:14Z | 2 | 674938173537 | eni-0c0ec0fee693ea022 | 192.168.1.182 | 192.168.70.132 | 49645 | 12146 | 6 |
| 2022-04-13T16:10:14Z | 2 | 674938173537 | eni-0c0ec0fee693ea022 | 192.168.1.182 | 192.168.70.132 | 44627 | 12146 | 6 |
| 2022-04-13T16:10:14Z | 2 | 674938173537 | eni-0c0ec0fee693ea022 | 192.168.1.182 | 192.168.70.132 | 38971 | 12146 | 6 |
| 2022-04-13T16:10:09Z | 2 | 80716028345 | eni-0786d2a22cc427c77 | 192.168.67.14 | 192.168.3.134 | 8080 | 65478 | 6 |
| 2022-04-13T16:10:09Z | 2 | 80716028345 | eni-0786d2a22cc427c77 | 192.168.67.14 | 192.168.3.134 | 8080 | 50605 | 6 |
| 2022-04-13T16:10:09Z | 2 | 80716028345 | eni-0786d2a22cc427c77 | 192.168.67.14 | 192.168.3.134 | 8080 | 65479 | 6 |

FIG.5

VISUALIZER FOR CLOUD-BASED 5G DATA AND TELEPHONE NETWORKS

CROSS-REFERENCE TO RELATED APPLICATIONS

This application claims priority to U.S. Provisional Patent Application No. 63/331,117, filed on Apr. 14, 2022, and entitled "VISUALIZER FOR CLOUD-BASED SYSTEMS," which is incorporated herein by reference.

TECHNICAL FIELD

The following discussion generally relates to data management for cloud-based systems, and in particular to a visualizer for cloud-based data and telephone networks.

BACKGROUND 5G networks cover vast areas with a substantial amount of infrastructure supporting various underlying network functions. A cloud-based implementation can have hundreds of accounts across multiple regions, and hundreds of disparate interfaces. Connectivity issues become difficult to diagnose with an unwieldy amount of interconnected support infrastructure. Diagnosis might hinge on manually opening flow logs for each interface, for example, which is time consuming and can include manually searching across many machines and accounts.

In a cloud-based implementation, the network operator lacks access to an inventory of the cloud-provider resources. For example, to locate an instance of a network function, personnel from the network operator might log into multiple accounts or use static subnet mapping information to deduce a location. This process is slow. A need exists for an effective way to locate instances of network functions and troubleshoot connectivity problems.

SUMMARY

Embodiments of 5G data and telephone networks can include processes, systems, and media for monitoring network functions running in a virtual private cloud (VPC). An example process can include the step of starting a first instance of a network function in the VPC. The first instance may run using a first user account of the VPC. A first log including entries associated with the first instance is generated in response to network activities of the first user account on the first instance of the network function. A second instance of the network function is started in the VPC. The second instance may run using a second user account of the VPC. A second log including entries associated with the second instance may be generated in response to network activities of the second user account on the second instance.

Various embodiments can include sending the first log and second log into a log destination associated with a centralized cloud account. A data stream comprising transformed data from the log destination may be sent into a data bucket associated with the centralized cloud account. The data bucket is queried using the centralized cloud account to select a data set, and the data set includes attributes of the first instance of the network function and of the second instance of the network function. The attributes are associated with the network activities of the first user account and the network activities of the second user account. The process may output the attributes associated with the network activities of the first user account and with the network activities of the second user account to a visualizer interface.

In various embodiments, the process includes applying a filter to mask the network activities of the second user account from the data set in response to an input in the visualizer interface. The input may include a source IP address of the first user account or a destination IP address of the first user account. A data delivery stream applies a transformation to the first log and the second log to generate the data stream. A notification queue of the data bucket is subscribed to the data delivery stream to trigger sending the data stream comprising transformed data from the log destination into the data bucket in real time. The network function can be an application function (AF), access and mobility management function (AMMF), authentication server function (AUSF), network function local repository (NRF), packet forwarding control protocol (PFCP), session management function (SMF), unified data management (UDM), unified data repository (UDR), or user plane function (UPF). The first instance of the network function may run in a virtualized distributed unit or in a virtualized central unit.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

FIG. 4 illustrates an example interface of a visualizer for assessing the status of cloud-based network functions in a 5G data and telephone network, in accordance with various embodiments.

FIG. 5 illustrates an example of a query-based interface for assessing user account status in a 5G data and telephone network, in accordance with various embodiments.

DETAILED DESCRIPTION

Figure 1:
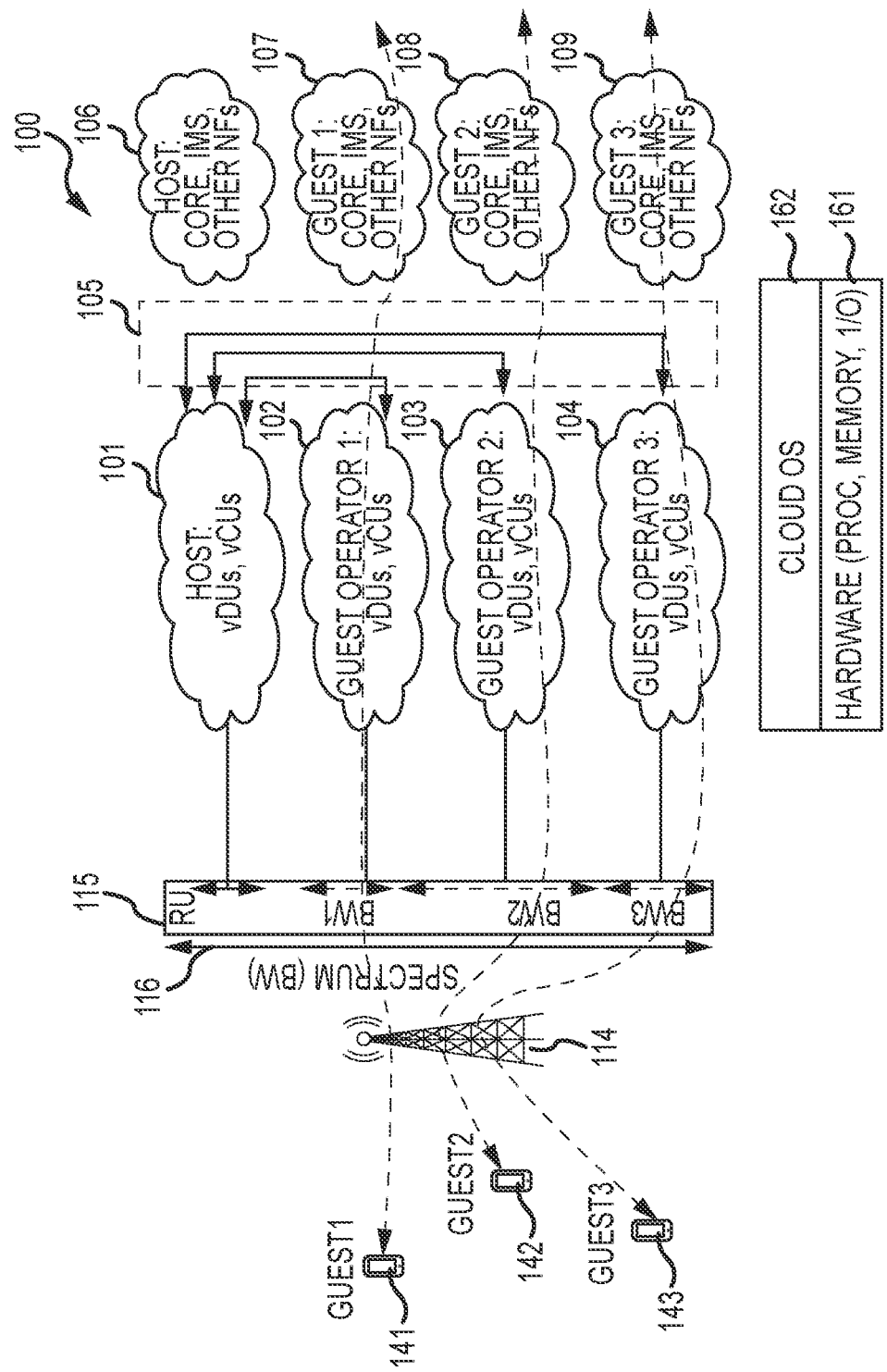
FIG. 1 illustrates an example of a 5G data and telephone network implemented using virtualized network functions, in accordance with various embodiments.

The following detailed description is intended to provide several examples that will illustrate the broader concepts set forth herein, but it is not intended to limit the invention or the application and uses of the invention. Furthermore, there is no intention to be bound by any theory presented in the preceding background or the following detailed description.

Systems, methods, and devices of the present disclosure support a visualizer for components of a 5G network built on cloud infrastructure. Various embodiments include inventory management and log query systems that can access logs from cloud-based telephone network infrastructure that supports various network functions. In one example, the system can access flow logs that capture information about traffic on network interfaces in a virtual private cloud (VPC). Data management tools of the present disclosure may be implemented by cloud services to host VPCs such as AWS, ServerSpace, Microsoft Azure, Google Cloud Platform, IBM Cloud Services, Kamatera, VMware, or any other cloud system. The operator of a cloud-based 5G data and telephone network does not have an inventory of all cloud-provider computing assets supporting their VPC on typical cloud computing platforms. Systems, methods, and devices of the present disclosure generate and aggregate custom log data from hundreds of user accounts to monitor computing resources of the cloud-based 5G data and telephone network at a single point.

As used herein, the term network function may describe a functional building block within a network infrastructure. Network functions typically include well-defined external interfaces and well-defined functional behavior. Network functions may be implemented in a cloud-based environment using virtualization tools such as, for example, virtual machines or containers. The systems described herein may thus spool up or retire network functions by launching a new instance or killing an existing instance of the network function. Examples of 5G core network functions suitable for virtualization and logging as described herein may include Application Function (AF), Access and Mobility Management Function (AMMF), Authentication Server Function (AUSF), Network Function Local Repository (NRF), Packet Forwarding Control Protocol (PFCP), Session Management Function (SMF), Unified Data Management (UDM), Unified Data Repository (UDR), or User Plane Function (UPF).

Various embodiments may use a query-based analysis system. The system can use flow logs to analyze the traffic flow of network interfaces on selected networks. Users can quickly troubleshoot connectivity issues using data management tools of the present disclosure to analyze hundreds of user accounts supporting cellular network functions across multiple regions. Flow logs are subscribed to each subnet and forwarded to a data collection, process, and analysis tool. The data collection, process, and analysis tool includes a data streaming service that delivers a data stream to a data bucket. The data is partitioned, generated, and visualized using techniques described below. An analytics tool queries data in the buckets to support a visualization of network functions in a 5G data and telephone network.

With reference now to FIG. 1, an example of a 5G data and telephone network 100 built on a cloud-based environment is shown, in accordance with various embodiments. 5G data and telephone network 100 is implemented on cloud-based infrastructure to facilitate dynamic network adaptations. 5G data and telephone network 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own RUs for use by one or more guest network operators, though the systems, methods, and devices described herein could be applied to any wireless network using virtualized network functions. Examples of guest network operators may include internal brands of the host operator, system integrators, enterprises, external MVNOs, or converged operators. The host and the guest network operators may maintain desired network functions to support user equipment (UE) 141, 142, 143.

The host and MVNOs may have their own user accounts and virtualized network functions to support operation of 5G data and telephone network 100. User accounts may be provisioned and deprovisioned frequently as virtualized assets come online and go offline to support increasing or decreasing demand for network functions.

In the example of FIG. 1, each RU 115 communicates with UE 141, 142, 143 operating within a geographic area using one or more antennas 114 (also referred to herein as towers) capable of transmitting and receiving messages within an assigned spectrum 116 of electromagnetic bandwidth. In various embodiments, guest networks 102, 103, 104 interact with a provisioning plane 105 to obtain desired spectrum across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host network 101. Network services and corresponding user accounts may be scaled up and down in response to network load, with logging for network functions occurring in real-time or near real-time.

The Open Radio Access Network (O-RAN) standard breaks communications into three main domains: the radio unit (RU) that handles radio frequency (RF) and lower physical layer functions of the radio protocol stack, including beamforming; the distributed unit (DU) that handles higher physical access layer, media access (MAC) layer, and radio link control (RLC) functions; and the centralized unit (CU) that performs higher level functions, including quality of service (QoS) routing and the like. The CU also supports packet data convergence protocol (PDCP), service data adaptation protocol (SDAP), and radio resource controller (RRC) functions. The RU, DU, and CU functions are described in more detail in the O-RAN standards, as updated from time to time, and may be modified as desired to implement the various functions and features described herein. In the example of FIG. 1, host network 101 maintains one or more DUs and CUs (i.e., network functions) as part of its own network. The DU communicates with one or more RUs 115, as specified in the O-RAN standard. The virtualized DUs and CUs generate logs in response to communications, logins, changes, system configurations, or other events suitable for logging.

The various network components shown in FIG. 1 are typically implemented using software or firmware instructions that are stored in a non-transitory data storage (e.g., a disk drive, solid-state memory, or other storage medium) for execution by one or more processors. The various components shown in FIG. 1 can be implemented using cloud computing hardware 161 and an appropriate operating system 162, such as the Amazon® Web Service (AWS) platform offered by Amazon Inc., although other embodiments could use other cloud platforms or any type of conventional physical computing hardware, as desired.

As illustrated in the example of FIG. 1, 5G network 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources. Virtual DUs, virtual CUs, and other virtualized network functions can write log files to a cloud-based repository. Visualizer tools of the present disclosure may ingest and analyze the log files in real time. Examples of 5G core network functions suitable for virtualization and logging as described herein may include AF, AMMF, AUSF, NRF, PFCP, SMF, UDM, UDR, UPF, or other 5G core network functions.

Guest networks 102, 103, 104 operated by guest operators can manage their own networks using allocated portions of spectrum 116 handled by one or more of the RUs 115 associated with host network 101. The guest networks 102, 103, 104 communicate with one or more UEs 141-143 using allocated bandwidth 117, 118, 119 on the host's RU 115. Guest networks 102, 103, 104 may include one or more virtual DUs and CUs, as well as other network services 106, 107, 108, 109. Generally, one or more guest operators will instantiate its own 5G virtualized network functions (e.g., CMS, vCUs, vDUs, etc.) using cloud-based resources, as noted above. However, various embodiments could operate wholly or partially outside of cloud-based environments.

Each RU 115 is typically associated with a different wireless cell that provides wireless data communications to user devices 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory), and appropriate interfaces to perform the various functions described herein. RUs are physically located on-site with antenna 114. Conventional 5G networks may make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of virtualized RUs 115 that provide highly configurable geographic coverage for a host or guest network, if desired.

Figure 2:
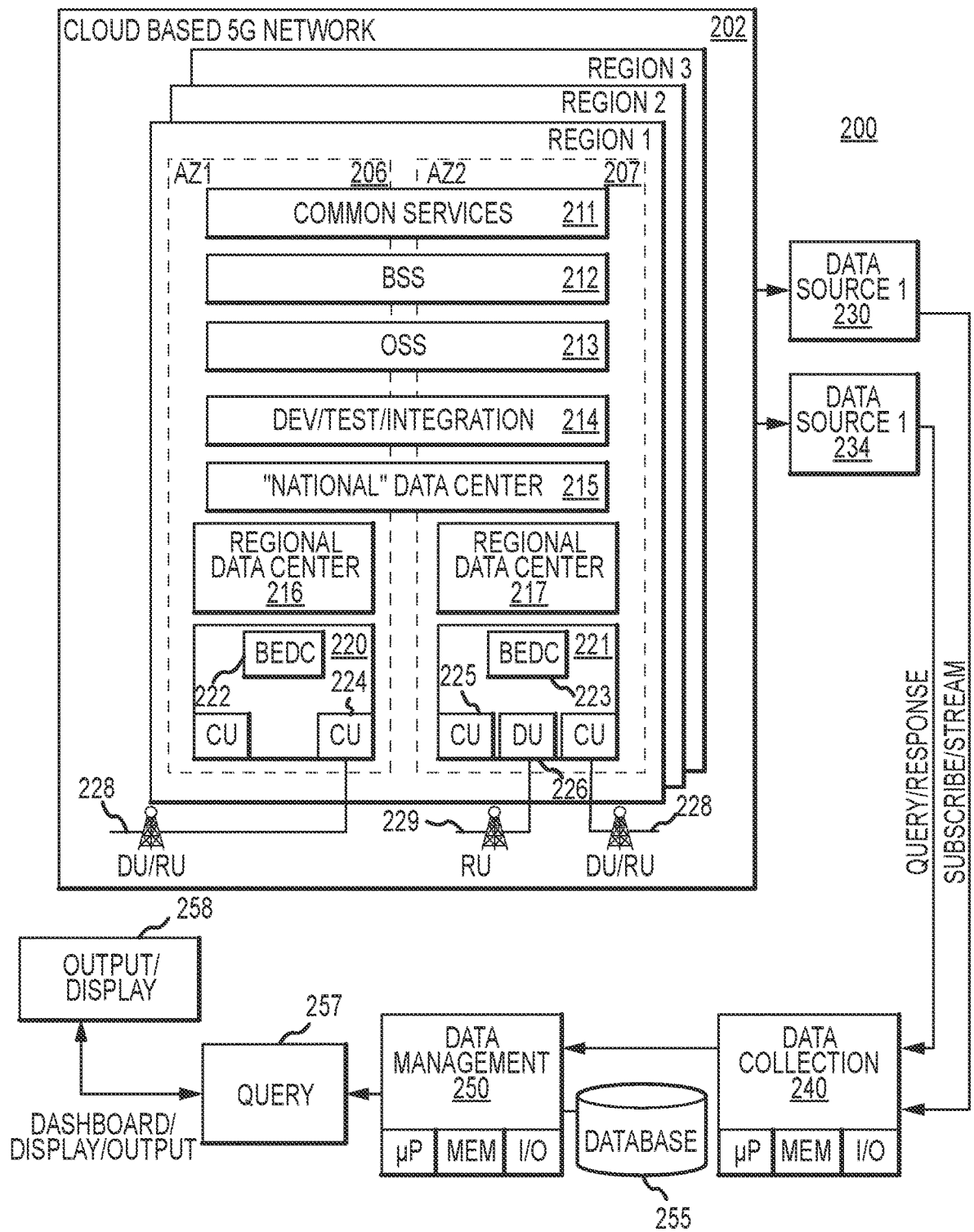
FIG. 2 illustrates an example of cloud infrastructure supporting a 5G data and telephone network, in accordance with various embodiments.

With reference to FIG. 2, an example of cloud-based computing resources 200 supporting 5G data and telephone network 200 is shown, in accordance with various embodiments. In the example of FIG. 2, 5G network 202 encompasses data processing services supporting multiple regions 204, each having one or more availability zones (AZs) 206, 207, each acting as a separate data center with its own redundant power, network connectivity and other resources. In some embodiments, the various AZs operating within the same region will provide redundancy in the event a neighboring AZ fails or is overloaded. New instances of network functions may be dynamically added to the network to support services of 5G data and telephone network 100 of FIG. 1. New instances may begin logging in response to being brought online.

The example of FIG. 2 illustrates three regions, with region 204 having two AZs 206, 207, although other embodiments could include any number of regions and AZs providing any number of services and resources. The regions and AZs are often described herein with reference to geographic locations, but in practice, the regions and AZs could be equivalently organized based upon customer density, user density, expected network demand, availability of electric power or bandwidth, or any other factors. As noted above, it will still be necessary to deploy RUs within broadcast range of end users. By implementing the other functions of the network using virtualized hardware operating within a cloud-type architecture, geographic restrictions on 5G network 202 can be reduced. This can provide substantial efficiencies in deployment and expansion of 5G network 202, while also allowing for more efficient use of computing resources, data storage, and electric power.

In example of FIG. 2, a network operator maintains ownership of one or more RUs 228, 229 associated with a wireless network cell. Each RU 228, 229 communicates with UE operating within a geographic area using one or more antennas. In the example illustrated in FIG. 2, common services (e.g., billing, guest network allocation, etc.) can be performed in a shared or common service 211 across the available AZs 206, 207. Typically, these shared services will be implemented within a common virtual private cloud (VPC) operating within the cloud environment. Similarly, shared VPC systems can support business support system (BSS) 212, operational support services (OSS) 213, development/test/integration features 214, or the like across the entire region. A region wide data center (identified as a "national" data center 215 in FIG. 2) could be implemented in a shared VPC across AZs 206, 207, if desired, with subordinate data centers (e.g., "regional" data centers 216, 217) being separated into different VPCs for each of the AZs 206, 207. Additional levels of data centers could be provided, if desired, or the different data center functions could be differently organized in any number of equivalent embodiments.

In the example of FIG. 2, each AZ 206, 207 includes one or more breakout edge data centers (BEDCs) each supporting a local zone (LZ) with one or more RUs. The BEDCs are ideally organized for low latency to with high throughput and low latency to the various UE operating within the LZ. BEDCs 222, 223 may host VPC 220, 221 or other virtualization environment that typically implement one or more CUs 224, 225 in accordance with the O-RAN specifications. BEDCs may also implement user plane functions that handle user data sessions for gaming, streaming, and other network services, as desired. Again, any number of BEDCs and other data centers may be implemented using any number of different or shared VPCs in the cloud environment.

As noted above, each of the various network components shown in FIG. 2 are typically implemented using software or firmware instructions that are stored in a non-transitory data storage (e.g., a disk drive or solid-state memory) for execution by one or more processors within the VPC. VPCs may provide any number of additional features to support the data handling functions of the system, including redundancy, scalability, backup, key management, or the like.

The various components of network 202 can be implemented using virtual private clouds (VPC) or other virtual hardware components. Each of these VPCs will typically produce data during operation that indicates status, performance, capacity, or any number of other parameters. It is generally desired to monitor the status of network 202. One way to track network status is to process the large amount of data produced by the various modules and components to generate dashboards or other reports that can be viewed by an operator. Operating data can also be used to adjust the configuration or operation of the network.

In various embodiments that make use of a data pipeline, one or more data sources 230, 234 can be provided to obtain raw data from one or more of the components of network 202. Data sources 230, 234 may receive data as part of a data stream, if desired. Other data sources 230, 234 may receive and maintain log data or the like from one or more associated components. Any number of streaming or query-based data sources 230, 234 may be deployed within cloud-based computing resources 200 as desired.

In the example shown in FIG. 2, data source 230 may be configured in accordance with real time data and message queue tools such as, for example, the KINESIS Data Firehose supported by AWS. Data source 230 can supply a delivery stream of data to a selected destination in real time. The cloud-based tools described herein may be installed to execute on any sort of hardware, including a conventional computer server with a processor, memory, and input/output interfaces to the appropriate components of network 202. Equivalently, data source 230 may be implemented using a virtual private cloud or virtual server system as part of a cloud provider, as desired.

The streaming data source 230 will typically be configured to receive real-time data (or near real time data, accounting for some delays inherent in data processing, communications, and the like) from one or more network functions of network 202. Streaming data may be particularly useful for network components that generate substantial amounts of real-time data (e.g., performance measurements, communication failures, etc.). Data source 230 will be configured to receive the data stream from the monitored network functions or instances, typically as a consumer process executed by data source 230. Other embodiments may use different cloud-based architecture or may be configured in any other manner.

If desired, multiple components of 5G network 202 could supply streaming data to a common data source 230. Virtualized DU 226 and CU 224, 225 modules of network 202, in particular, provide substantial amounts of real-time data that can be efficiently pipelined through a combined streaming data source 230 in some embodiments. Core network functions can also have logs streamed into data source 230.

In the example of FIG. 2, data source 234 is shown as a query-based source that collects data from one or more components of network 202. Generally speaking, data handled by query-based sources tends to be less reliant upon real-time delivery for status updates or the like. Log data, fault metrics, performance metrics, and other types of time-series data may be particularly well-suited for query-type collection.

In one embodiment, query-based data source 234 is implemented for a pull-based data collection model using HTTP-type messaging. Software is configured to run on a computer server (implemented with conventional hardware or cloud-based resources as desired) that queries the monitored components according to any desired time schedule to receive data. The data received in response to the queries may be locally cached in any sort of non-transitory memory (e.g., solid state memory, magnetic or optical memory, cloud-based sources, or the like) for subsequent retrieval and processing as desired. Query-based data sources may be particularly useful in tracking data produced by the various DUs, MTAs, and other components of the network that produce substantial amounts of log data. Typically, each component is configured to write its output/log data to the data source 234, as desired.

Although FIG. 2 illustrates one streaming data source 230 and one query-based data source 234, in practice any number of different sources could be used to monitor any number of different components of network 202. Some components may provide streaming data and query-based data to multiple data sources.

In various embodiments, data collection system 240 can communicate with one or more data sources 230, 234 to obtain streaming or query-based data. In various embodiments, data collection system 240 subscribes to one or more data feeds or other streaming services associated with data sources 230. Data collection system 240 may also be configured to perform queries against query-based data sources 234. Data source 234 typically receives the requested or subscribed data, formats or filters the received data as appropriate, and forwards the collected data to a data management system 250 for storage, reporting, or any other further processing as desired. In an AWS-based example, an S3 data bucket could be the destination for a KINESIS Data Firehose stream. The S3 data bucket may comprise a notification queue, and the delivery stream may subscribe to the queue to deliver streaming data to the data bucket.

In various embodiments, the data collection system 240 receives data in JSON or similar format, appends source or service location information as tags or the like, and pushes the tagged data to the data management system 250 (using, e.g., HTTP structures or the like). Generally, the data collection system will be configurable to specify batch sizes, delivery times, or other parameters for obtaining query-based data or for pushing collected data to data management system 250. Some embodiments may also filter the received data as desired to remove unwanted or unnecessary data that would otherwise consume excess storage in data management system 250. Other embodiments may perform additional monitoring, as needed.

Data management system 250 is any data processing system capable of receiving the data from data source 234 and presenting the collected data for further use. In various embodiments, data management system 250 is a computer server implemented with conventional or virtual cloud-based hardware executing software for managing collected data. In various embodiments, data management system 250 stores received data in a database 255 (e.g., an S3 data bucket) for later retrieval, as desired. Data management system 250 may also provide reports to human or automated reviewers. Data management system 250 could include, for example, ATHENA analytics capable of receiving and executing query 257 against database 255.

Output 258 can be displayed visually in dashboard form, for example, and can display results from query 257. Output 258 can be in a machine-readable form such as a tagged data store, a JSON file, or other structured or unstructured data formats. Output 258 may include input channels in some embodiments to dynamically configure query 257. Output 258 can be used to assess network performance and account characteristics of virtualized network functions in a 5G data and telephone network.

The example illustrated in FIG. 2 shows data sources 230, 234 as obtaining aggregated data from components of network 202. This points out the relationships between the sources of data, data collection system 240, and data management system 250. In a practical implementation, however, data collection system 240 may be equivalently configured to subscribe to live data streams or to directly poll components of network 202, without the need for separate data aggregation systems.

In some equivalent embodiments, the functionality of data sources 230, 234 is designed into the components of the network 202 themselves, thereby obviating the need for separate aggregation. One or more components of network 202 may be configured to supply a data stream directly to data collection system 240, for example. Similarly, data collection system 240 could posit queries directly to components of network 202, if desired, without the need for intervening processing modules. Processed data is provided for delivery to the data management system 250 described above. In various embodiments, output feature 258 provides data to data management system 250 using HTTP structures (e.g., HTTP "PUT" features), JSON, unstructured data, or the like. Other embodiments could implement the various functions and components described herein in any number of equivalent arrangements.

In operation, then, a data management system 250 obtains streaming or query-based data from one or more components of a 5G wireless network operating within a cloud-based computing environment. The data is obtained directly from the component, or via intervening data source systems 230, 234, that aggregate data from multiple data sources within network 202. Collected data is tagged and filtered as desired, and the resulting data is delivered to a data management system for storage, reporting, or other actions as appropriate. Other embodiments may include other processing modules in addition to those illustrated, or may provide the various features and functions described herein using equivalent arrangements of processing modules and features.

Figure 3:
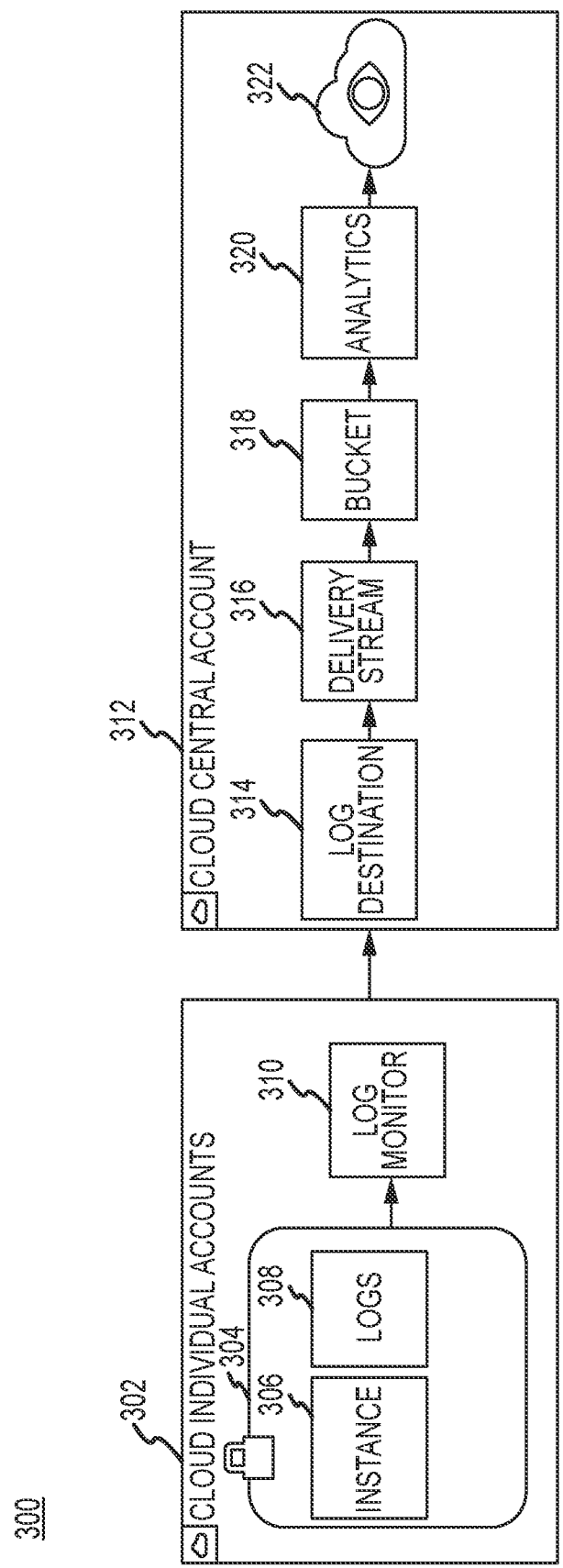
FIG. 3 illustrates an example system for monitoring cloud-based network functions of a 5G data and telephone network, in accordance with various embodiments.

Referring now to FIG. 3, an example of visualizer system 300 for monitoring cloud-based network functions of a 5G data and telephone network is illustrated, in accordance with various embodiments. System 300 includes instances 306 of cloud-based network functions. Instances 306 of network functions may perform operations using individual cloud accounts 302. Each instance 304, a group of instances 304, or other functional grouping may have associated user accounts. Instances 304 of network functions can include virtualized load balancers, virtualized containers, virtual machines, or services running on cloud-based infrastructure. Instances 304 of 5G core network functions may run on vDUs or vCUs. 5G core network functions can include, for example, AF, AMMF, AUSF, NRF, PFCP, SMF, UDM, UDR, or UPF. Hundreds of user accounts can be active on instances 306 at a given time. Each active user account can generate log data for selected events. Examples of selectable events for logging include network communications, attempted network communications, function calls, logins, resource usage thresholds, or other triggers suitable for instance 306 to generate log data 308. For example, a log can be written each time a network function makes or attempts a network communication. Logs can also be generated in response to communications or other events on selected subnets, VPCs, or other functional groupings.

In various embodiments, individual cloud accounts 302 can generate log data 308 related to instances 306 on which the user accounts are performing operations. A log monitor 310 may be used to push log data out from individual cloud accounts 302. An example of log monitor 310 in an AWS system might be CLOUDWATCH logs. Log monitor 310 pushes logs to log destination 314, which can be subscribed to log monitor 310 in some embodiments. Log destination 314 is typically in a centralized cloud account 312. Centralized cloud account 312 has access to logs from each individual cloud accounts 302 generating log data.

Various embodiments include data delivery stream 316 that applies transformations to log data 308 delivered to log destination 314 to generate a data stream accessible by centralized cloud account 312. Data delivery stream 316 delivers its data stream to bucket 318. Some embodiments data delivery stream 316 can be subscribed to a message queue of bucket 318 to automate delivery of log data to bucket 318. Analytics interface 320 can access transformed log data stored in bucket 318. Analytics interface can query bucket 318 to select targeted data sets based on primary keys, attributes, or traits captured in log data 308 of network functions on a 5G data and telephone network. Data sets can thus include data from log entries with attributes and other metadata relating to network activity for individual cloud accounts 302 and instances of network functions.

Some embodiments of analytics interface 320 can perform SQL-based queries against data warehouses, big data stores, data lakes, or other data structures and generate a single set of federated output from each data source. Visualizer 322 accesses output from analytics interface 320 to monitor instances 304 of network functions in the 5G data and telephone network.

With reference to FIG. 4, navigation interface 400 is shown, in accordance with various embodiments. Navigation interface 400 allows users to sort through log data 308 from network functions rapidly using various sets of criteria. Search interface 402 can accept free text searches and match them against characteristics and metadata relating to VPC assets. Logical groupings of asset types 404 include accounts, buckets, elastic IP addresses (EIPs), elastic Kubernetes service (EKS) clusters, elastic network interfaces (ENIs), images, instances, load balancers, logs, systems manager (SSM) patching information, security groups, subnets, or volumes, for example. These groupings each represent a type of asset instantiated in the VPC. Other logical groupings could be used depending on log data ingested into centralized cloud account 312. A timestamp 406 is included for the last update to log data associated with an asset type 404. Log data may be updated in real time, and the viewable data set in navigation interface 400 may be updated in response to a query run against the log data stored in bucket 318 (of FIG. 3). Asset types 404 may be navigable by clicking the title of the desired asset, which triggers a query for the asset type against bucket 318.

Referring now to FIG. 5, visualizer interface 500 is shown for monitoring and assessing log data 308 (of FIG. 3) from individual cloud accounts 302 (of FIG. 3). Visualizer interface 500 includes filters 502 applicable to data set 504. Filters applicable to network communications in a cloud-based environment can include account ID, source address, destination address, protocol, time, region, action, destination port, source port, or interface ID, for example, though other filters can be applied to other data fields output from individual cloud accounts 302. Data set 504 can include data in addition to the filterable data such as, for example, protocol, start time, end time, log status, ingestion time, communication size, or other information related to logged network activity. The data set is generated by querying bucket 318 using analytics interface 320. Filters 502 can be used to focus on activity that spans multiple individual cloud accounts 302 (of FIG. 3) without requiring independent login and review of logs associated with individual cloud accounts 302.

Figure 6:
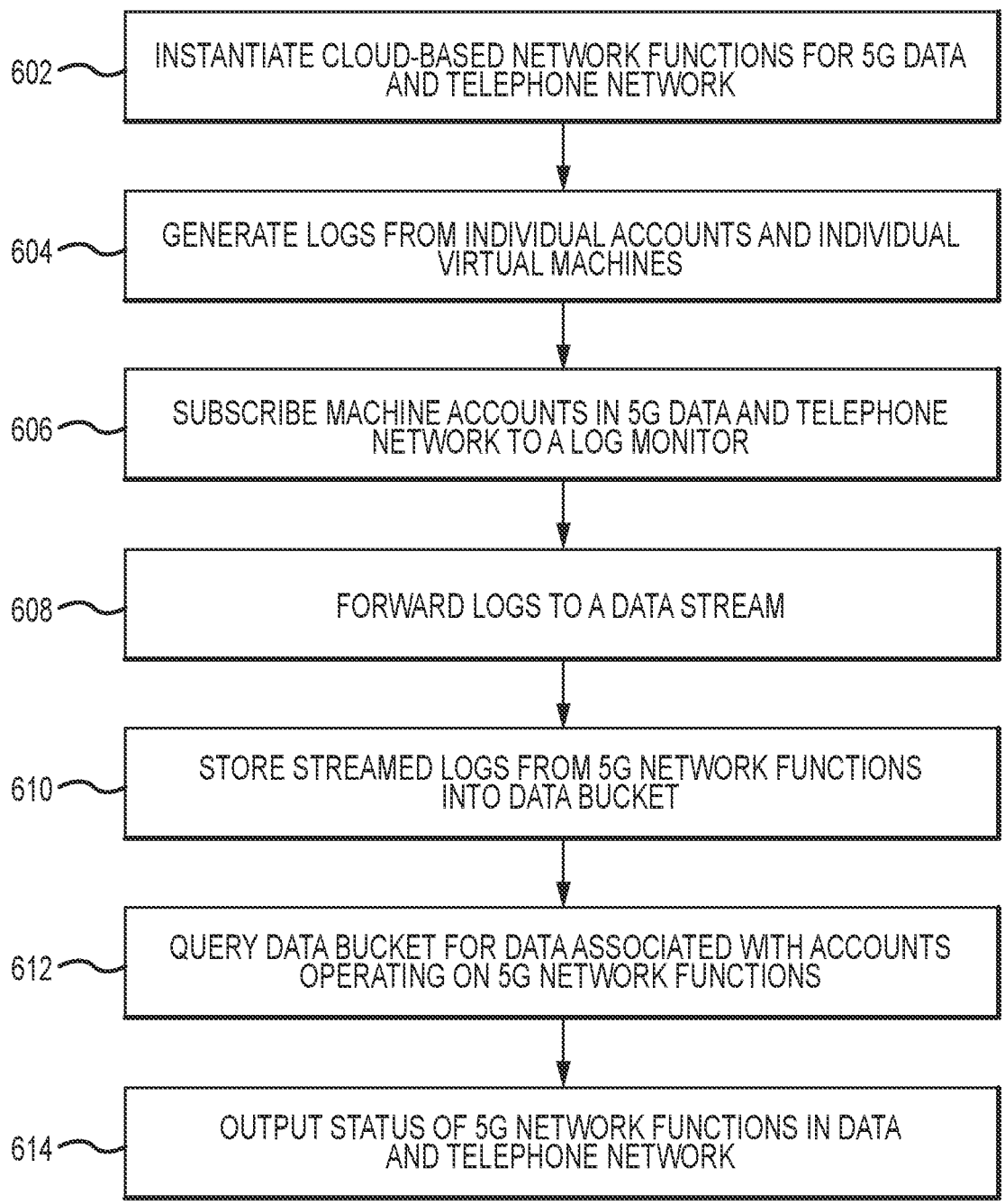
FIG. 6 illustrates an example process for real-time monitoring on a 5G data and telephone network, in accordance with various embodiments.

FIG. 6 illustrates an example process 600 for monitoring network functions in 5G data and telephone network 100 of FIG. 1, in accordance with various embodiments. Process 600 includes instantiating network functions in a cloud environment (Block 602). Instances 306 (of FIG. 3) of network functions can include individual cloud accounts 302 (of FIG. 3). Hundreds of cloud accounts 302 may be active on 5G data and telephone network 100 at a time. Cloud-based instances 306 generate logs from individual accounts 302 and individual instances 306 (Block 604). Logs can be triggered in response to network activity and can include data corresponding to asset types 404 (of FIG. 4) and filters 502 (of FIG. 5).

Various embodiments use subscription to communicate log data 308 (of FIG. 3) from instances 306 to a log monitor 310 (of FIG. 3). For example, each individual cloud account 302 performing operations on instance 306 may be subscribed to log monitor 310 (Block 606). Logs are forwarded to a data delivery stream 316 (of FIG. 3) for ingestion (Block 608). System 300 stores streamed logs in data bucket 318 (of FIG. 3) in response to transformation of the logs by data delivery stream 316 (Block 610).

Analytics interface 320 (of FIG. 3) queries data bucket 318 to create data set 504 (of FIG. 5) including data associated with individual cloud accounts 302 (Block 612). Analytics interface 320 can run a query against any type of data stored in data bucket 318. The data bucket 318, analytics interface 320, data delivery stream 316, and log destination 314 can each be unified under a centralized cloud account 312. Centralized cloud account 312 can thus monitor all instances of core network functions operating across 5G data and telephone network 100 without logging into hundreds of individual cloud accounts 302. System 300 may output the status of network functions in 5G data and telephone network 100 (Block 614).

Monitoring tools of the present disclosure can search through Terabytes of structured and unstructured data within a few minutes. The data can be unified and accessible through a centralized cloud account to enable engineers to query in a few seconds without logging into hundreds of different individual user accounts. Visualizers can be configured to dynamically update in response to polling, and they may add new services to the inventory within a few minutes using the logging and ingestion techniques described above. Visualizers of the present disclosure may also be deployed using a central account that uses a cross-account role, which can be deployed to all accounts using StackSet in AWS, for example. New accounts may thus be available as soon as they are added to the organization. Connectivity issues can be quickly resolved using the data management tools described above to analyze hundreds of user accounts supporting network functions across multiple regions of a 5G data and telephone network.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced, are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for monitoring network functions running in a virtual private cloud (VPC) of a cellular telephone network, comprising:
    starting a first instance of a network function in the VPC, wherein the first instance runs using a first user account of the VPC;
    generating a first log including a first entry associated with the first instance in response to a first network communication of the first user account on the first instance of the network function;
    starting a second instance of the network function in the VPC, wherein the second instance runs using a second user account of the VPC;
    generating a second log including a second entry associated with the second instance in response to a second network communication of the second user account on the second instance;
    sending the first log and second log into a log destination associated with a centralized cloud account;
    sending a data stream comprising transformed data from the log destination into a data bucket associated with the centralized cloud account;
    querying the data bucket using the centralized cloud account to select a data set, wherein the data set includes attributes of the first instance of the network function and of the second instance of the network function,
    wherein the attributes are associated with the first network communication of the first user account and the second network communication of the second user account; and
    outputting the attributes associated with the first network communication of the first user account and with the second network communication of the second user account to a visualizer interface,
    wherein the attributes comprise an account ID, a source address, and a destination address of the first network communication of the first user account on the first instance of the network function.

2. The automated process of claim 1, further comprising applying a filter to mask the second network communication of the second user account from the data set in response to an input in the visualizer interface.

3. The automated process of claim 2, wherein the input comprises a source IP address of the first user account.

4. The automated process of claim 2, wherein the input comprises a destination IP address of the first user account.

5. The automated process of claim 1, further comprising applying, by a data delivery stream, a transformation to the first log and the second log to generate the data stream.

6. The automated process of claim 5, further comprising subscribing a notification queue of the data bucket to the data delivery stream to trigger the sending the data stream comprising transformed data from the log destination into the data bucket in real time.

7. The automated process of claim 1, wherein the network function comprises an application function (AF), access and mobility management function (AMMF), authentication server function (AUSF), network function local repository (NRF), packet forwarding control protocol (PFCP), session management function (SMF), unified data management (UDM), unified data repository (UDR), or user plane function (UPF).

8. The automated process of claim 1, wherein the first instance of the network function runs in a virtualized distributed unit or in a virtualized central unit.

9. A visualizer system for monitoring network functions running in a virtual private cloud (VPC) of a cellular telephone network, the visualizer system comprising a processor in communication with a non-transitory memory storing instructions that, when executed by the processor, cause the visualizer system to perform operations, the operations comprising:
   starting a first instance of a network function in the VPC, wherein the first instance runs using a first user account of the VPC;
   generating a first log including a first entry associated with the first instance in response to a first network communication of the first user account on the first instance of the network function;
   starting a second instance of the network function in the VPC, wherein the second instance runs using a second user account of the VPC;
   generating a second log including a second entry associated with the second instance in response to a second network communication of the second user account on the second instance;
   sending the first log and second log into a log destination associated with a centralized cloud account;
   sending a data stream comprising transformed data from the log destination into a data bucket associated with the centralized cloud account;
   querying the data bucket using the centralized cloud account to select a data set, wherein the data set includes attributes of the first instance of the network function and of the second instance of the network function,
   wherein the attributes are associated with the first network communication of the first user account and the second network communication of the second user account; and
   outputting the attributes associated with the first network communication of the first user account and with the second network communication of the second user account to a visualizer interface,
   wherein the attributes comprise an account ID, a source address, and a destination address of the first network communication of the first user account on the first instance of the network function.

10. The visualizer system of claim 9, wherein the operations further comprise applying a filter to mask the second network communication of the second user account from the data set in response to an input in the visualizer interface.

11. The visualizer system of claim 10, wherein the input comprises a source IP address of the first user account.

12. The visualizer system of claim 9, wherein the first instance of the network function runs in a virtualized distributed unit or in a virtualized central unit.

13. The visualizer system of claim 9, wherein the operations further comprise applying, by a data delivery stream, a transformation to the first log and the second log to generate the data stream.

14. The visualizer system of claim 13, wherein the operations further comprise subscribing a notification queue of the data bucket to the data delivery stream to trigger the sending the data stream comprising transformed data from the log destination into the data bucket in real time.

15. The visualizer system of claim 9, wherein the network function comprises an application function (AF), access and mobility management function (AMMF), authentication server function (AUSF), network function local repository (NRF), packet forwarding control protocol (PFCP), session management function (SMF), unified data management (UDM), unified data repository (UDR), or user plane function (UPF).

16. A non-transitory computer-readable medium having instructions stored thereon that, when executed in a virtual private cloud (VPC), cause the VPC to perform operations comprising:
   starting a first instance of a network function in the VPC, wherein the first instance runs using a first user account of the VPC;
   generating a first log including a first entry associated with the first instance in response to a first network communication of the first user account on the first instance of the network function;
   starting a second instance of the network function in the VPC, wherein the second instance runs using a second user account of the VPC;
   generating a second log including a second entry associated with the second instance in response to a second network communication of the second user account on the second instance;
   sending the first log and second log into a log destination associated with a centralized cloud account;
   sending a data stream comprising transformed data from the log destination into a data bucket associated with the centralized cloud account;
   querying the data bucket using the centralized cloud account to select a data set,
   wherein the data set includes attributes of the first instance of the network function and of the second instance of the network function,
   wherein the attributes are associated with the first network communication of the first user account and the second network communication of the second user account; and
   outputting the attributes associated with the first network communication of the first user account and with the second network communication of the second user account to a visualizer interface,
   wherein the attributes comprise an account ID, a source address, and a destination address of the first network communication of the first user account on the first instance of the network function.

17. The non-transitory computer-readable medium of claim 16, wherein the operations further comprise applying a filter to mask the second network communication of the second user account from the data set in response to an input in the visualizer interface.

18. The non-transitory computer-readable medium of claim 16, wherein the first instance of the network function runs in a virtualized distributed unit or in a virtualized central unit.

19. The non-transitory computer-readable medium of claim 17, wherein the operations further comprise applying, by a data delivery stream, a transformation to the first log and the second log to generate the data stream.

20. The non-transitory computer-readable medium of claim 19, wherein the operations further comprise subscribing a notification queue of the data bucket to the data delivery stream to trigger the sending the data stream comprising transformed data from the log destination into the data bucket in real time.

* * * * *